United States Patent
Ota et al.

(10) Patent No.: US 9,843,283 B2
(45) Date of Patent: Dec. 12, 2017

(54) CONTROL DEVICE OF ROTATING ELECTRIC MACHINE AND METHOD FOR CONTROLLING THE SAME

(71) Applicant: TOYOTA JIDOSHA KABUSHIKI KAISHA, Toyota-shi, Aichi-ken (JP)

(72) Inventors: Takashi Ota, Toyota (JP); Youhei Yamada, Kariya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/892,119

(22) PCT Filed: May 19, 2014

(86) PCT No.: PCT/IB2014/000855
§ 371 (c)(1),
(2) Date: Nov. 18, 2015

(87) PCT Pub. No.: WO2014/188264
PCT Pub. Date: Nov. 27, 2014

(65) Prior Publication Data
US 2016/0094174 A1 Mar. 31, 2016

(30) Foreign Application Priority Data
May 21, 2013 (JP) ................. 2013-106823

(51) Int. Cl.
*H02P 23/08* (2006.01)
*H02P 21/00* (2016.01)
(52) U.S. Cl.
CPC .......... *H02P 23/08* (2013.01); *H02P 21/0025* (2013.01)

(58) Field of Classification Search
CPC ........................... H02P 21/0025; H02P 23/08
See application file for complete search history.

(56) References Cited

U.S. PATENT DOCUMENTS 5,408,169 A * 4/1995 Jeanneret ............ B60L 11/1803
318/805
5,705,909 A * 1/1998 Rajashekara ....... B60L 11/1803
318/801

(Continued)

FOREIGN PATENT DOCUMENTS

| JP | 58-201591 A | 11/1983 |
| JP | 8-289405 A | 11/1996 |

(Continued)

OTHER PUBLICATIONS

Partial Translation of the Office Action dated Mar. 12, 2015 from the Japanese Patent Office in counterpart application No. 2013-106823.

*Primary Examiner* — Shawki S Ismail
*Assistant Examiner* — Muhammad S Islam
(74) *Attorney, Agent, or Firm* — Sughrue Mion, PLLC

(57) ABSTRACT

An electronic control unit includes calculating a slip frequency of a rotating electric machine from a torque instruction value to the rotating electric machine and a target value of output efficiency to the rotating electric machine, calculating a frequency of the instruction signal from the slip frequency and a rotational frequency of the rotating electric machine, the slip frequency being changed by changing the target value of the output efficiency with the torque instruction value maintained and changing the slip frequency so as to change the frequency of the instruction signal to out of an inverter lock frequency band when the frequency of the instruction signal is included in the inverter lock frequency band.

3 Claims, 8 Drawing Sheets

(56) References Cited

U.S. PATENT DOCUMENTS

| | | |
|---|---|---|
| 2009/0021198 A1 | 1/2009 | Okamura et al. |
| 2010/0090641 A1* | 4/2010 | Oyake .................. H02P 1/50 |
| | | 318/716 |
| 2014/0232308 A1 | 8/2014 | Watanabe et al. |

FOREIGN PATENT DOCUMENTS

| | | |
|---|---|---|
| JP | 2003-92803 A | 3/2003 |
| JP | 2005-354785 A | 12/2005 |
| JP | 2007-259631 A | 10/2007 |
| JP | 2010-25042 A | 2/2010 |
| JP | 2010-130890 A | 6/2010 |
| JP | 2012-228131 A | 11/2012 |
| JP | 2013-81308 A | 5/2013 |

* cited by examiner

CONTROL DEVICE OF ROTATING ELECTRIC MACHINE AND METHOD FOR CONTROLLING THE SAME

BACKGROUND OF THE INVENTION

1. Field of the Invention

The present invention relates to a control device for controlling an induction type rotating electric machine and a method for controlling the same.

2. Description of Related Art

Conventionally, there has been provided an inverter converting direct current power into alternating current power between a DC power source such as a battery and an AC rotating electric machine. The inverter is provided with a plurality of switching elements such as insulated gate bipolar transistors (IGBT) or metal oxide semiconductor field-effect transistors (MOSFET).

The switching element performs ON/OFF action in response to an instruction signal for driving a rotating electric machine. Here, it has been known that when the frequency of the instruction signal is a low frequency or 0 Hz, inverter lock occurs in which current flows to a particular switching element for a long time. If the amplitude of the instruction signal is large at this time, it comes that a large current flows to a particular switching element for a long time thereby overheating that switching element. Thus, since conventionally, when the inverter lock occurs and then, a large current is detected, inverter protection control for reducing current or voltage to protect the switching element has been performed.

For example, according to Japanese Patent Application Publication No. 2007-259631 (JP 2007-259631 A), if such a control device detects a locked state (state in which the rotation speed is almost zero) of a synchronous type rotating electric machine, it reduces the electric power to be applied to the inverter. According to Japanese Patent Application Publication No. 2012-228131 (JP 2012-228131 A), if the control device detects the locked state of the synchronous type rotating electric machine, it calculates a lockable time which permits the locked state of the synchronous rotating electric machine in response to a coil temperature and an output torque value of the rotating electric machine. According to Japanese Patent Application Publication No. 2005-354785 (JP 2005-354785 A), if the control device detects the locked state of the synchronous type rotating electric machine, it supplies current to the switching elements on which no current is concentrated.

According to Japanese Patent Application Publication No. 8-289405 (JP 8-289405 A), the control device changes the maximum value of the slip frequency for the induction type rotating electric machine in response to the temperature of an electric motor.

SUMMARY OF THE INVENTION

If the induction type rotating electric machine is used, the frequency of the instruction signal to be supplied to the rotating electric machine is a sum of a measured value of the rotational frequency of the rotor and the slip frequency. Thus, if the rotational frequency and the slip frequency have each different sign so that part or all of their respective values are cancelled by each other, the frequency of the instruction signal becomes 0 Hz or a low frequency thereby generating the inverter lock.

The slip frequency is determined in response to a torque instruction value to the rotating electric machine. If it is desired to output a positive torque from the rotating electric machine during a power running, for example, the slip frequency is set to a positive value. As a result, the torque instruction value becomes positive so that the slip frequency also becomes positive. On the other hand, if the rotational speed of the rotating electric machine is negative (the rotational frequency is also negative), the inverter lock may occur.

As a specific example of the above-described ones, a state in which a vehicle is about to start on a climbing lane can be mentioned. When the rotating electric machine is used as a driving source of a vehicle and a vehicle driver attempts to start a vehicle which remains stopped on a climbing lane, the driver releases a brake pedal and depresses an accelerator pedal instead. At this time, the vehicle slides back along the climbing lane slightly due to the release of the brake pedal, and when the accelerator pedal is depressed, a positive torque instruction is output to the rotating electric machine. As a result, the rotational speed of the rotating electric machine is negative while the slip frequency is positive. Further, upon such a startup on the climbing lane, driver's depressing of the accelerator pedal sometimes may be relatively strong, so that accompanied thereby, a large current flows into switching elements.

In such a case, if inverter protection control for reducing the voltage or the current to the inverter is performed like conventionally, the output torque of the rotating electric machine decreases. Because the torque of the driving source decreases upon the startup on the climbing lane, drivability may drop. On the other hand, when the inverter protection control is invalidated although the frequency of the instruction signal is included in the inverter lock frequency band while a large current flows, there is a fear that the inverter might be overheated. Accordingly, the present invention provides a control device and a control method for rotating electric machine capable of preventing reduction in the torque of the rotating electric machine, for example, upon startup on a climbing lane while suppressing overheating of the inverter.

A first aspect of the invention is a control device for rotating electric machine. The control device includes: an electronic control unit configured to output an instruction signal in response to a driving request to the rotating electric machine; and, an inverter configured to convert direct current power into alternating current power based on the instruction signal and supply the converted alternating current power to the rotating electric machine, the electronic control unit being configured to: (a) calculate a slip frequency of the rotating electric machine from a torque instruction value to the rotating electric machine and a target value of output efficiency to the rotating electric machine; (b) calculate the frequency of the instruction signal from the slip frequency and the rotational frequency of the rotating electric machine; and (c) change the slip frequency so as to change the frequency of the instruction signal to out of the inverter lock frequency band, the slip frequency being changed by changing the target value of the output efficiency with the torque instruction value maintained, when the frequency of the instruction signal is included in an inverter lock frequency band.

According to the above-described aspect, reduction of the torque of the rotating electric machine can be suppressed while suppressing overheating of the inverter. In the above aspect, the electronic control unit may be configured to inhibit, the frequency of the instruction signal from being changed to within the inverter lock frequency band for a predetermined period after the frequency of the instruction signal is changed to out of the inverter lock frequency band.

A second aspect of the present invention provides a control method for rotating electric machine wherein the rotating electric machine is controlled by an electronic control unit and an inverter, the electronic control unit outputting an instruction signal in response to a driving request of the rotating electric machine and the inverter configured to convert direct current power into alternating current power based on the instruction signal and supply the converted alternating current power to the rotating electric machine, the control method comprising: (a) calculating, by the electronic control unit, a slip frequency of the rotating electric machine from a torque instruction value to the rotating electric machine and a target value of output efficiency to the rotating electric machine; (b) calculating, by the electronic control unit, the frequency of the instruction signal from the slip frequency and the rotational frequency of the rotating electric machine; and (c) changing, by the electronic control unit, the slip frequency so as to change the frequency of the instruction signal to out of the inverter lock frequency band, the slip frequency being changed by changing the target value of the output efficiency with the torque instruction value maintained, when the frequency of the instruction signal is included in the inverter lock frequency band. In the above aspect, the frequency of the instruction signal may be inhibited from being changed to within the inverter lock frequency band for a predetermined period by the electronic control unit after the frequency of the instruction signal is changed to out of the inverter lock frequency band by the electronic control unit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
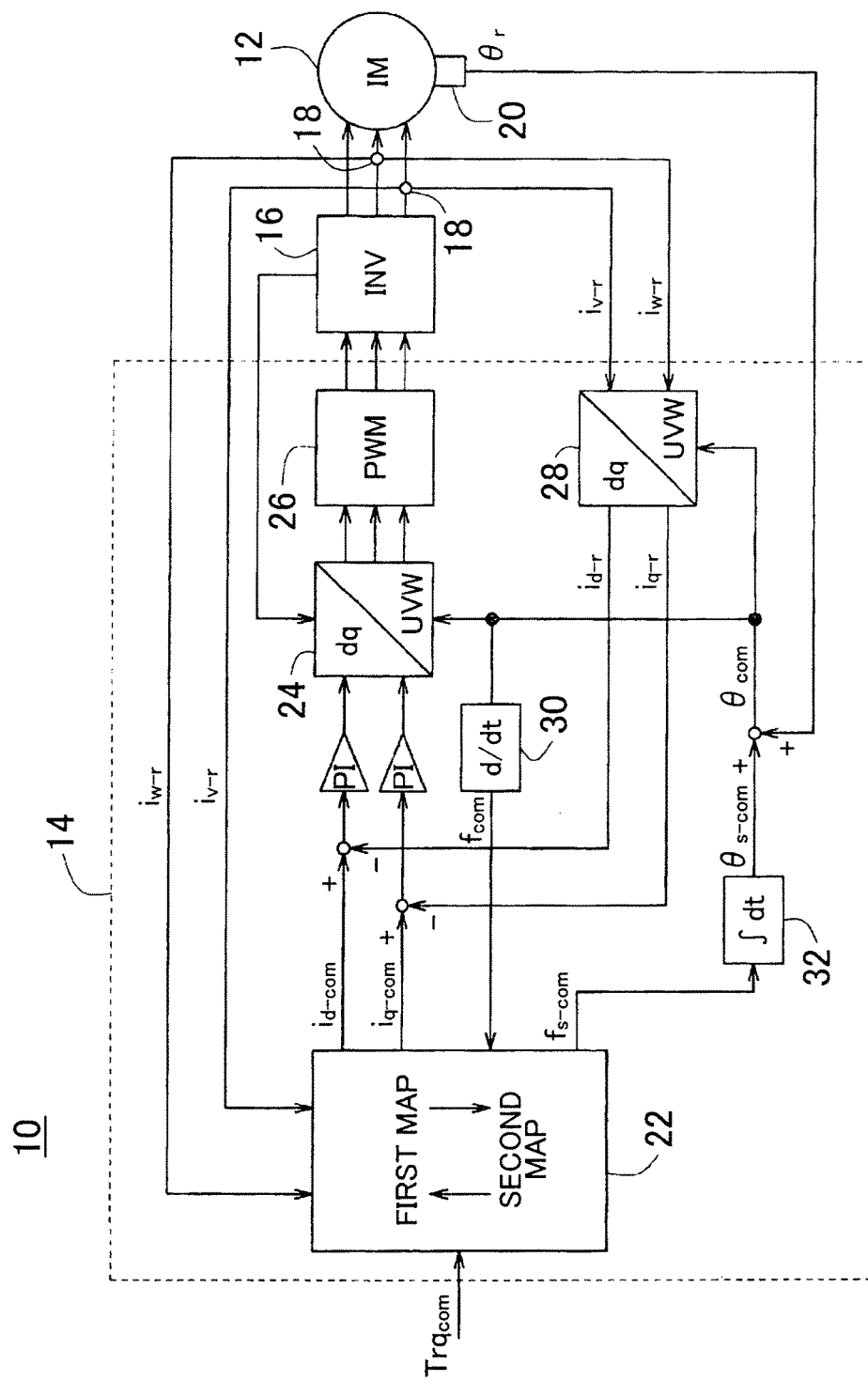
FIG. 1 is a block diagram including a control device of rotating electric machine according to the present embodiment.

FIG. 1 shows a block diagram including a control device 10 of a rotating electric machine and the rotating electric machine 12 which is a control target thereof according to the present embodiment. The rotating electric machine 12 is an induction type rotating electric machine such as a three-phase induction electric motor. Further, the rotating electric machine 12 is used as a driving source of a vehicle such as a hybrid vehicle, an electric vehicle.

The control device 10 includes an electronic control unit 14, an inverter 16, a current sensor 18 and a rotational phase detector 20. The inverter 16 is a power converter which performs orthogonal transform of electric power based on an instruction signal to the rotating electric machine 12 and supplies a converted alternating current power (AC power) to the rotating electric machine 12. The inverter 16 receives direct current power (DC power) from a DC power supply (not shown) such as a battery and converts the DC power to AC power in response to the instruction signal. The inverter 16 is a three-phase voltage type inverter, for example. The inverter 16 is provided with a switching element which is turned ON/OFF by a switching arm of each phase.

The current sensor 18 measures the value of current supplied from the inverter 16 to the rotating electric machine 12. If the rotating electric machine 12 is of three-phase type, the current sensor 18 may be configured to measure currents of two phases thereof. Because the sum of the instantaneous value of three-phase currents $i_u$, $i_v$, $i_w$ is zero, if current values of the two phases thereof can be detected, a current value of the remaining phase can be calculated. In FIG. 1, the current sensor 18 acquires a current measurement value $i_{v-r}$ of a V phase and a current measurement value $i_{w-r}$ of a W phase.

The rotational phase detector 20 calculates a rotational phase $\theta_r$ of the rotating electric machine 12. The rotational phase detector 20 is constituted of, for example, a resolver or hall device and a computing unit for computing these measurement values. Calculation of a rotational phase $\theta_r$ is performed as follows, for example. A rotational speed $\omega_r$ the rotor of the rotating electric machine 12 is acquired by the resolver or the hall device and the computing device calculates an electrical angle frequency $f_r$ through an arithmetic processing of (rotational speed/60)×(number of poles/2). By integrating this calculated electrical angle frequency $f_r$, the rotational phase detector 20 can obtain a rotational phase $\theta_r$ (=$2\pi f_r t + \theta_0$, where $\theta_0$ is an initial phase).

The electronic control unit 14 outputs an instruction signal in response to a driving request to the rotating electric machine 12 to control the rotating electric machine 12. The electronic control unit 14 is configured to include a computing circuit such as a microcomputer and a memory means such as a random access memory (RAM) and a read-only memory (ROM). The electronic control unit 14 includes an instruction value computing unit 22, a two-phase/three-phase conversion unit 24, a PWM signal generation unit 26, a three-phase/two-phase conversion unit 28, and an integrator 32.

The two-phase/three-phase conversion unit 24 converts differential values between instruction values $i_{d-com}$ and $i_{q-com}$ of d-axis current and q-axis current output from the instruction value computing unit 22 (amplitudes in both cases), and measurement values $i_{d-r}$ and $i_{q-r}$ of the d-axis current and the q-axis current sent from the current sensor 18 through the three-phase/two-phase conversion unit 28 (amplitudes in both cases) to each three-phase instruction signal. Upon this conversion, the two-phase/three-phase conversion unit 24 acquires a phase $\theta_{com}$ of magnetic flux of the rotating electric machine 12 described below and converts the instruction value from the dq coordinate system to the three-phase coordinate system which is a static coordinate system based thereon.

If the inverter 16 is of voltage type, before inputting a differential value between the instruction value and the measurement value of the d-axis current and the q-axis current respectively to the two-phase/three-phase conversion unit 24, a voltage value is obtained by proportional integration processing (PI control processing). This voltage value is converted to a three-phase voltage value by the two-phase/three-phase conversion unit 24.

The PWM signal generation unit 26 outputs a PWM instruction signal which is output from the two-phase/three-phase conversion unit 24 and corresponds to the three-phase instruction signal to the inverter 16. For example, by comparing the three-phase instruction signal with a carrier output from an oscillator (not shown), a PWM instruction signal which specifies ON/OFF timing (duty ratio) of the switching element of the inverter 16 is output.

The three-phase/two-phase conversion unit 28 converts the three-phase current measurement values $i_{v-r}$, $i_{w-r}$ obtained by the current sensor 18 and U-phase current value $i_{u-r}$ calculated from these values to two-phase current measurement values $i_{d-r}$, $i_{q-r}$. Like the two-phase/three-phase conversion unit 24, the three-phase/two-phase conversion unit 28 acquires a phase $\theta_{com}$ of magnetic flux of the rotating electric machine 12 and converts from the three-phase coordinate system which is a static coordinate system to the dq coordinate system based on this phase.

The integrator 32 integrates slip frequency instruction values $f_{s-com}$ output from the instruction value computing unit 22 and outputs an instruction value $\theta_{s-com}$ ($=2\pi f_{s-com}t+\theta_0$, where $\theta_0$ is an initial phase) of the slip angle phase. Here, it is assumed that the slip frequency instruction value $f_{s-com}$ is an electrical angle frequency (=mechanical radian frequency×(number of poles/2)). By adding the instruction value $\theta_{s-com}$ of the slip angle phase to the rotational phase $\theta_r$ obtained by the rotational phase detector 20, the phase $\theta_{com}$ of the magnetic flux of the rotating electric machine 12 is calculated.

The instruction value computing unit 22 outputs an instruction signal to the rotating electric machine 12 in response to a torque instruction value $Trq_{com}$. The torque instruction value $Trq_{com}$ is calculated by another electronic control unit (ECU) (not shown) from an accelerator pedal depressing amount (driving request) and the like of a vehicle (not shown), for example.

The instruction value computing unit 22 obtains the received instruction values $i_{d-com}$ and $i_{q-com}$ of the d-axis current and the q-axis current and the slip frequency instruction value $f_{s-com}$ based on the received torque instruction value $Trq_{com}$ and "the first map" or "the second map".

Figure 2:
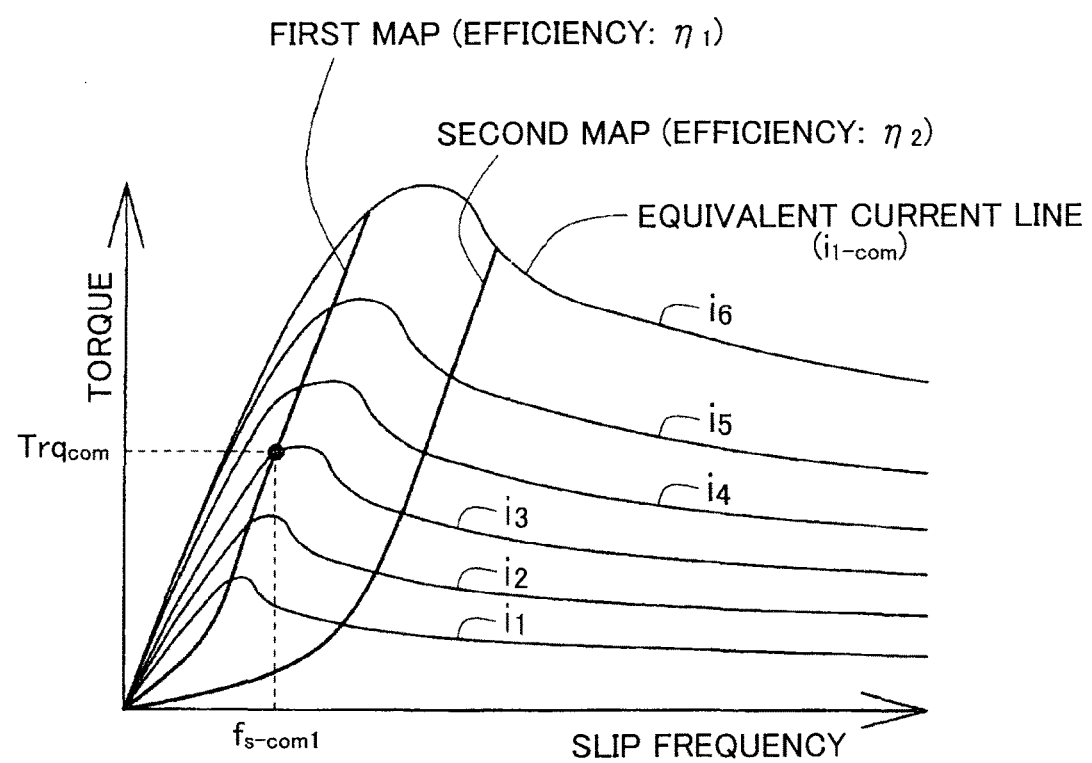
FIG. 2 is a diagram for explaining a first map and a second map.

"The first map" or "the second map" will be described. FIG. 2 shows the torque-slip characteristic of the rotating electric machine 12 of each current value. A curve which connects points each having an equal current value is called "equivalent current line". In the induction type rotating electric machine 12, it has been known that output efficiency of the rotating electric machine 12 changes in response to the slip frequency. That is, on the equivalent current line, the output efficiency of the rotating electric machine 12 differs depending on a position on that line.

A curve is produced by connecting predetermined output efficiency points on plural equivalent current lines. For example, a curve is produced by connecting maximum output efficiency $\eta_1$ on the respective equivalent current lines. In the present embodiment, the curve which is produced by connecting points each having equivalent output efficiency is called "map". Because the map is produced by connecting points each having equivalent output efficiency, a plurality of the maps can be produced for each output efficiency.

In the present embodiment, the map which connects the maximum output efficiency points ($\eta=\eta_1$) is produced and this map is called "first map". Further, a map which is produced by connecting predetermined output efficiency points ($\eta=\eta_2<\eta_1$) whose efficiency is lower than the first map is called "second map". In the meantime, it has been known that the induction type rotating electric machine has a characteristic in which the output efficiency decreases as the slip frequency increases, and as a result of reflection of this characteristic, the second map is shifted to a higher slip frequency side than the first map. The "first map" and the "second map" are stored in a storage means such as ROM (not shown) in the form of an expression or table (table).

If the first map is used, the torque instruction values $Trq_{com}$ to the rotating electric machine 12 are plotted on the vertical axis in FIG. 2 and a line is extended therefrom in parallel to the horizontal axis so as to obtain an intersection with the first map (output efficiency $\eta_1$). By obtaining this intersection, the slip frequency $f_{s-com}=f_{s-com1}$ and the current instruction value $i_{1-com}=i_3$ can be obtained to output the torque instruction value $Trq_{com}$ at the output efficiency $\eta_1$. That is, the instruction value computing unit 22 obtains the slip frequency instruction value $f_{s-com}$ and the current instruction value $i_{1-com}$ from the torque instruction value and an output efficiency target value to the rotating electric machine 12.

The current instruction value $i_{1-com}$ is a current value of the stator side (primary side) of the rotating electric machine 12 and is converted to the instruction values $i_{d-com}$ and $i_{q-com}$ of the d-axis current and the q-axis current through the predetermined conversion process. For example, when the rotating electric machine 12 is vector-controlled, the current instruction value $i_{1-com}$ is divided to torque current component and excitation current component by using the slip frequency instruction value $f_{s-com}$, and the former is used as the instruction value $i_{q-com}$ of the q-axis current and the latter is used as the instruction value $i_{d-com}$ of the d-axis current. Instead, it is permissible to set that $i_{d-com}=i_{1-com}$ and that $i_{q-com}=0$.

Further, when the instruction signal frequency $f_{com}$ which is a sum of the slip frequency instruction value $f_{s-com}$ and the rotational frequency $f_r$ of the rotating electric machine 12 is contained in the inverter lock frequency band while a large current is being supplied, that is, when it looks that the inverter protection control is just about to be performed, the instruction value computing unit 22 performs the inverter lock avoidance control. In the inverter lock avoidance control, by changing the slip frequency instruction value $f_{s-com}$, the instruction signal frequency $f_{com}$ ($=f_{s-com}+f_r$) is changed and as a result, the instruction signal frequency $f_{com}$ is changed to out of the inverter lock frequency band. In the meantime, here, it is assumed that the slip frequency instruction value $f_{s-com}$, the rotational frequency $f_r$ of the rotating electric machine 12, and the instruction signal frequency $f_{com}$ are all electrical angle frequencies. Further, hereinafter, the instruction signal frequency $f_{com}$ is called "electrical frequency $f_{com}$".

Inverter lock refers to a state in which the electrical frequency $f_{com}$ is a low frequency or 0 Hz and current flows to a particular switching element for a long time. The inverter lock frequency band refers to a frequency range in which the inverter lock occurs, for example, a range within ±10 Hz.

The electrical frequency $f_{com}$ can be obtained by differentiating the phase $\theta_{com}$ ($=2\pi f_{com}t+\theta_0$) of magnetic flux of the rotating electric machine 12. The instruction value computing unit 22 acquires the electrical frequency $f_{com}$ output from a differentiator 30 and performs the inverter lock avoidance control in response to the value of the electrical frequency $f_{com}$.

Figure 3:
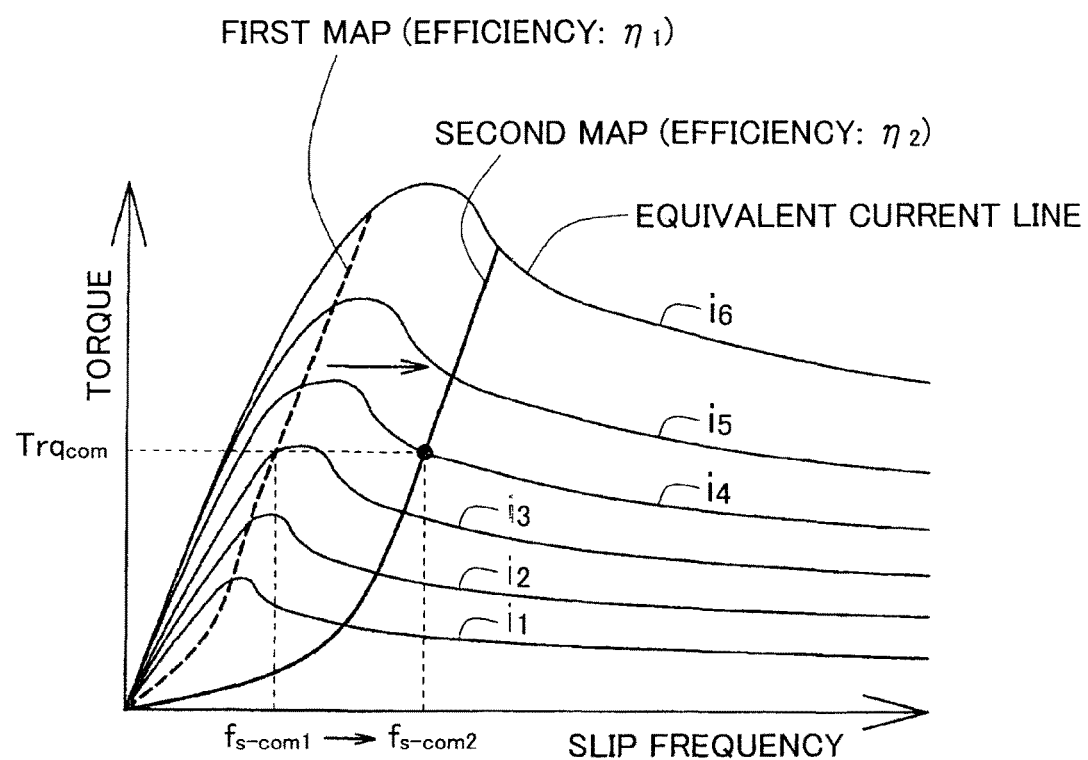
FIG. 3 is a diagram for explaining the first map and the second map.

In the present embodiment, the change of the slip frequency instruction value $f_{s\text{-}com}$ in the inverter lock avoidance control is performed by switching the map. As described above, the second map has been shifted to a frequency side with a higher frequency than the first map. Thus, as shown in FIG. 3, under a condition in which the torque instruction value $Trq_{com}$ is fixed, the slip frequency $f_{s\text{-}com2}$ based on the second map is shifted to a higher frequency side relative to the slip frequency $f_{s\text{-}com}$ based on the first map. The electrical frequency $f_{com}$ is shifted to the high frequency side by this shift to the high frequency side and as a result, it is possible to escape from the inverter lock frequency band.

Considering such a feature that the frequency is shifted to the high frequency side, it is preferable to set the second map. For example, the second map may be determined so that a shifting width from the first map is equal to or more than the inverter lock frequency band.

Further, during the execution of the inverter lock avoidance control, by leaving only an equivalent current line of a current value less than the current value which enables the inverter protection control to be executed, the execution of the inverter protection control may be avoided.

In the present embodiment, by switching the map, in other words, changing the target value of the output efficiency to the rotating electric machine 12, the slip frequency can be changed. By changing the slip frequency, the electrical frequency $f_{com}$ can be changed to out of the inverter lock frequency band. As a result, the operation of the inverter protection control can be avoided thereby making it possible to suppress reduction of the torque of the rotating electric machine upon startup of a vehicle on a climbing lane.

In the present embodiment, as shown in FIG. 3, with the torque instruction value $Trq_{com}$ maintained, the slip frequency is changed. Thus, the torque of the rotating electric machine 12 is prevented from dropping when the electrical frequency $f_{com}$ is switched.

Figure 4A:
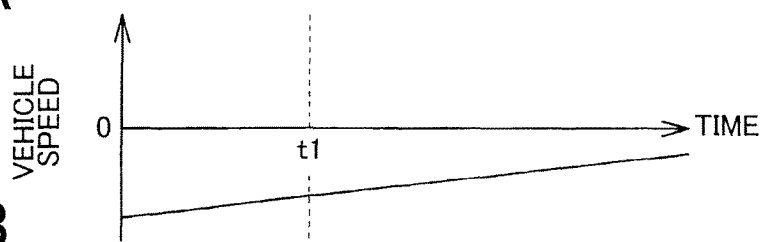
FIGS. 4A, 4B, 4C, 4D are diagrams for explaining the inverter lock avoidance control.
Figure 4B:
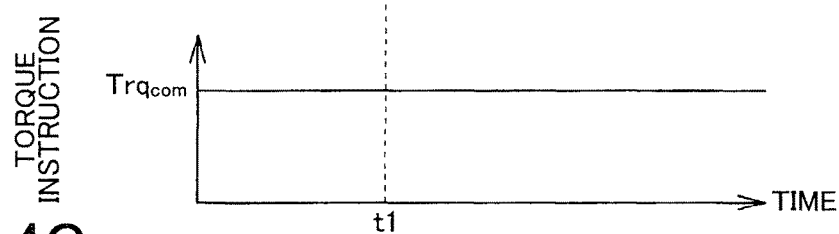
Figure 4C:
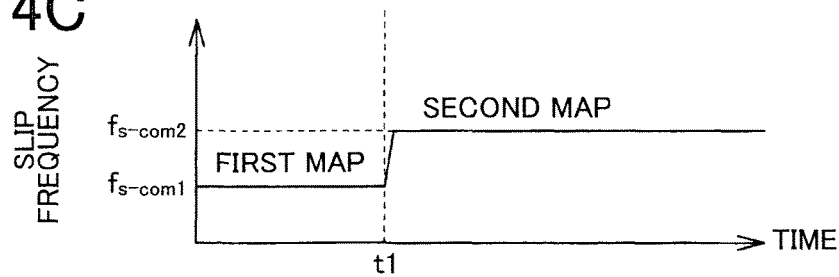
Figure 4D:
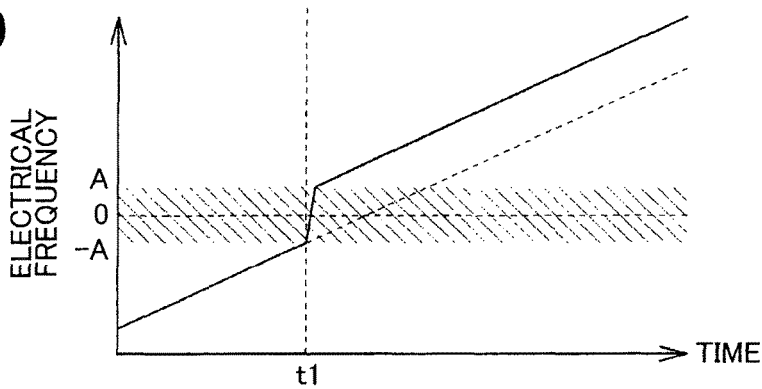
Figure 5A:
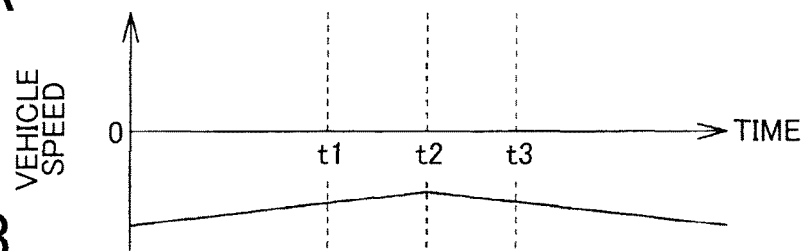
FIGS. 5A, 5B, 5C, 5D are diagrams for explaining the inverter lock avoidance control.
Figure 5B:
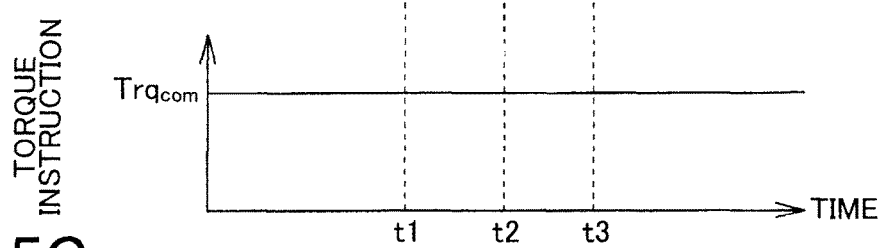
Figure 5C:
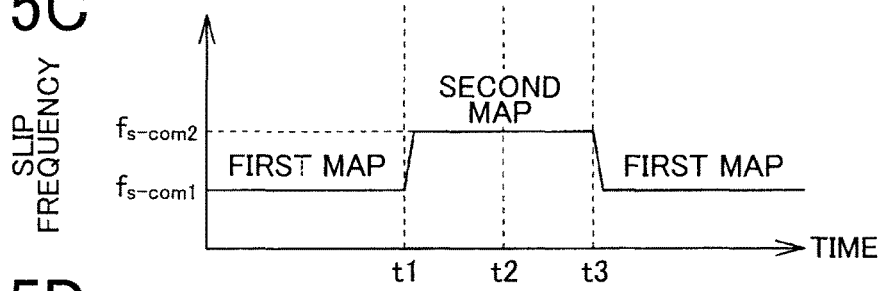
Figure 5D:
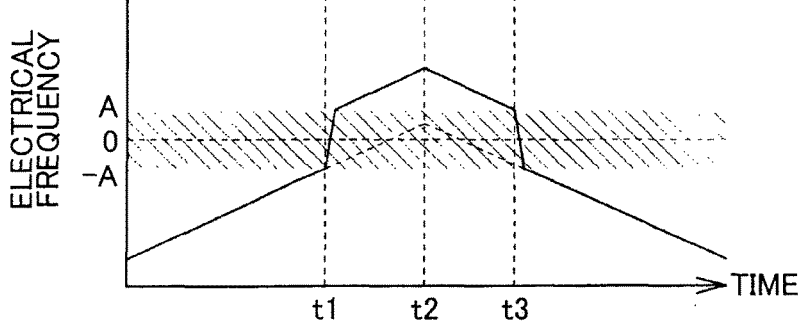

FIGS. 4A through 4D show a specific example of the inverter lock avoidance control. FIG. 4A shows a change of vehicle velocity with a time passage (time chart), FIG. 4B shows a change of torque instruction with a time passage (time chart), FIG. 4C shows a change of the slip frequency with a time passage (time chart), and FIG. 4D shows a change of the electrical frequency with a time passage (time chart). In the time chart of the electrical frequency, the inverter lock frequency band is hatched with oblique lines. Further, the lower limit value of the inverter lock frequency band is indicated with −A[Hz] and the upper limit value thereof is indicated with A[Hz].

The example shown in FIGS. 4A through 4D indicate a driving condition in which the vehicle velocity increases gradually from a negative value to 0 side. This is, for example, a condition in which when a vehicle slides down on a climbing lane, the sliding-down is eliminated by depressing the accelerator pedal.

In the example shown in FIGS. 4A through 4D, it is assumed that the torque instruction is maintained at a predetermined positive value to facilitate the description. Further, in the time chart which indicates a selected map of FIG. 4C, it is assumed that the first map is selected as initial setting. If the torque instruction is constant, the slip frequency obtained from the first map is constant also.

As shown in the time chart of FIG. 4D, with elimination of the sliding-down, the rotation number of the rotating electric machine 12 increases gradually from a negative value toward 0, and accompanied therewith, the value of the rotational frequency $f_r$ of the rotating electric machine 12 also increases gradually from a negative value toward 0. On the other hand, because as the torque instruction, a constant positive value is output, the slip frequency $f_{s\text{-}com1}$ obtained from the first map becomes a positive constant value. As a result, the electrical frequency $f_{com}$ which is a sum of the rotational frequency $f_r$ and the slip frequency $f_{s\text{-}com1}$ approaches 0 gradually, so that it is included in the inverter lock frequency band at time t1.

At this time, the instruction value computing unit 22 switches the map for use from the first map to the second map, and obtains the slip frequency $f_{s\text{-}com2}$, based on the torque instruction value $Trq_{com}$ and the second map. By using the slip frequency $f_{s\text{-}com2}$, the electrical frequency $f_{com}$ is raised so that it escapes from the inverter lock frequency band. In the meantime, after FIGS. 4A through 4D, the second map is called just "avoidance map".

FIGS. 5A through 5D show other specific example of the inverter lock avoidance control than FIGS. 4A through 4D. This example indicates a case in which after time t2, the sliding-down vehicle velocity (negative vehicle velocity) increases although up to time t2, it is the same as FIGS. 4A through 4D. In this case, it is considered that the gradient of the climbing lane has changed (has become steep) although the torque instruction is constant, for example.

Since time t2, with an increase of the sliding-down vehicle velocity, the electrical frequency $f_{com}$ decreases (increases to the negative side) and at time t3, it comes that the electrical frequency $f_{com}$ is included in the inverter lock frequency band. At this time, the instruction value computing unit 22 switches the map for use from the second map to the first map and obtains the slip frequency $f_{s\text{-}com1}$, based on the torque instruction value $Trq_{com}$ and the first map. As a result, the electrical frequency $f_{com}$ is lowered (decreased), so that it escapes from the inverter lock frequency band.

Figure 6:
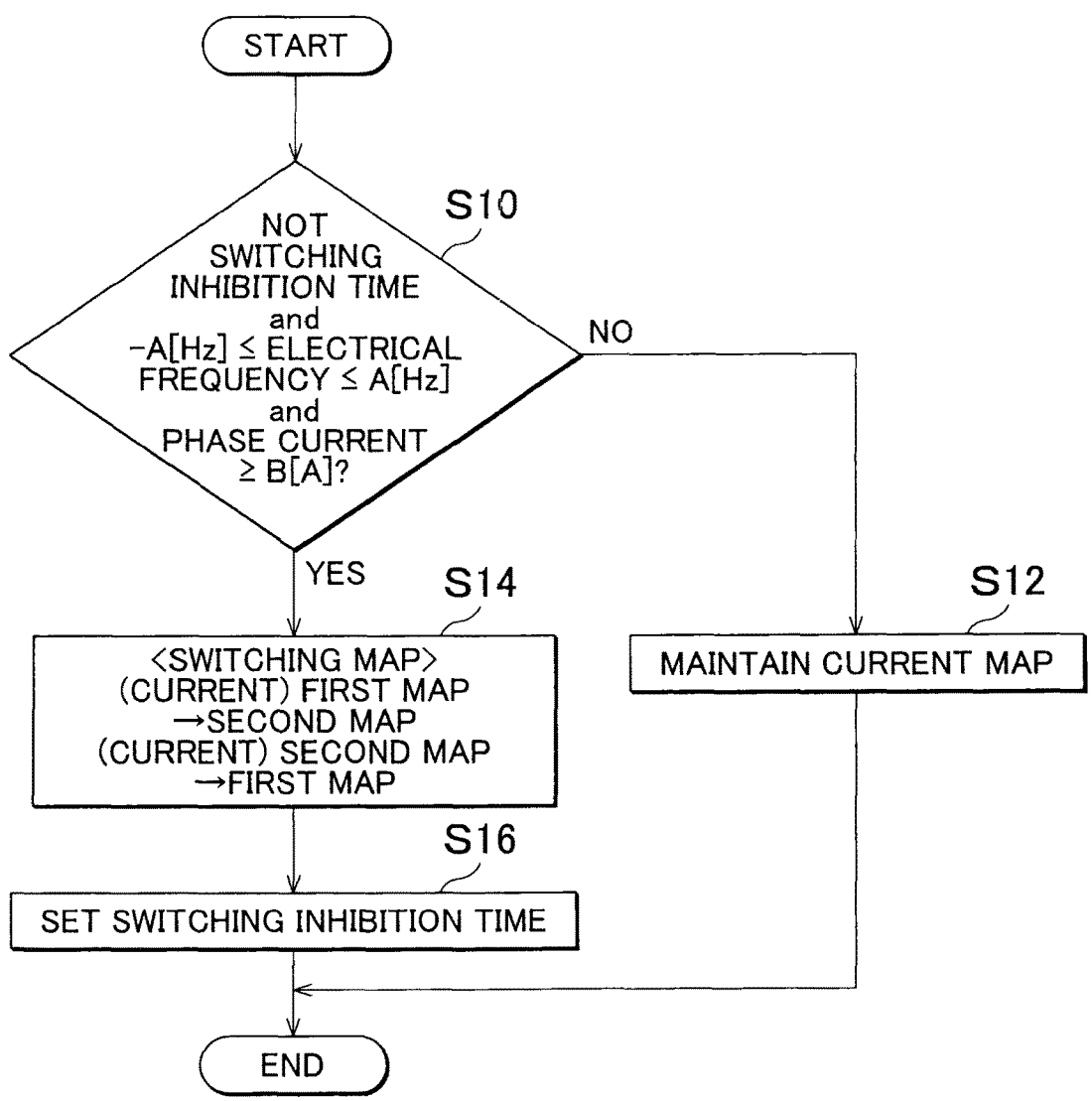
FIG. 6 is a flow chart for explaining a determination flow of the inverter lock avoidance control.
Figure 7A:
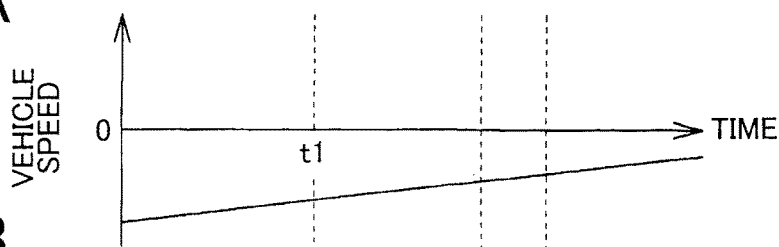
FIGS. 7A, 7B, 7C, 7D are diagrams for explaining the inverter lock avoidance control.
Figure 7B:
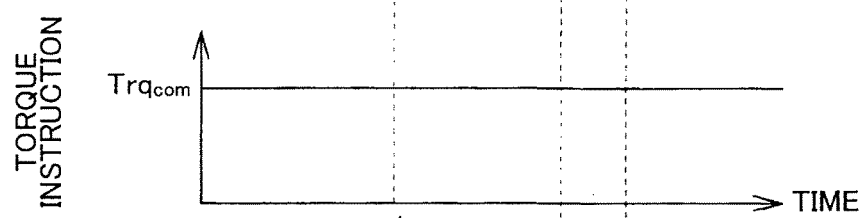
Figure 7C:
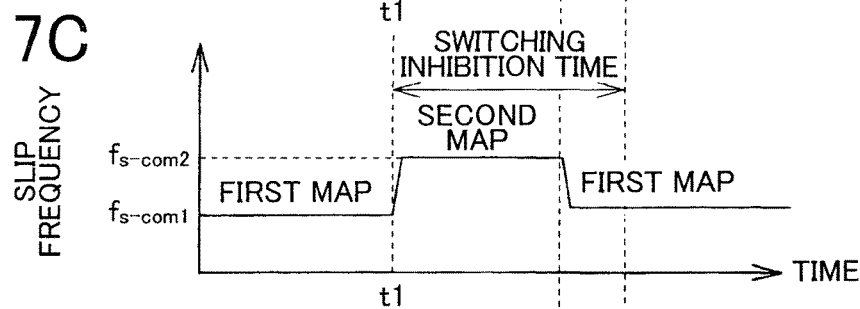
Figure 7D:
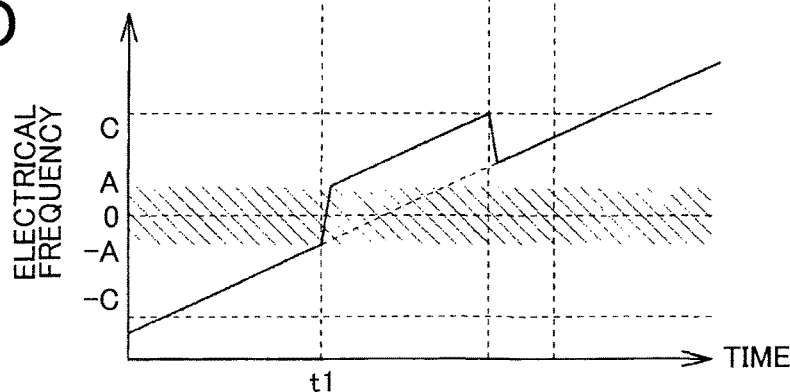

Next, a determination flow for determining whether the inverter lock avoidance control can be executed is indicated in FIG. 6. In the flow chart shown in FIG. 6, as a map switching condition, a condition of whether the phase current is equal to or more than a threshold and whether it is in switching inhibition time now are set as well as a condition of whether the electrical frequency $f_{com}$ is included in the inverter lock frequency band. In the meantime, the above-described two conditions may be omitted to simplify the flow.

Upon inverter lock, a current flows to a particular switching element for a long time. Because when a large current flows to the switching element, there is a fear that the switching element is overheated, the inverter protection control is executed. That is, if the particular switching element is supplied with (2) a large current (1) for a long time, the inverter protection control is executed. Thus, (1) even if a current flows to a particular switching element for a long time, (2) if its current value is small, no inverter protection control is executed. Then, according to the embodiment shown in FIG. 6, if the value of current flowing to the switching element is so low a value that no overheating of the switching element is induced, the switching of the map, that is, the inverter lock avoidance control is not performed. More specifically, the instruction value computing unit 22 determines whether any one of the current measurement values $i_{v\text{-}r}$, $i_{w\text{-}r}$ obtained by the current sensor 18 and the U-phase current measurement value $i_{u\text{-}r}$ calculated from these measurement values is equal to or more than a predetermined threshold.

Further, if hunting (vibration originating from control response) in which the switching of the first map and the second map frequently occurs is generated, the control becomes unstable. Thus, in the embodiment shown in FIG.

6, immediately after the switching of the map, the switching inhibition time when re-switching of the map is inhibited for a predetermined period is set up.

In step S10, the instruction value computing unit 22 performs three determination processings. As a first determination processing, whether the present is included in the switching inhibition time is determined. As a second determination processing, whether the electrical frequency $f_{com}$ is included in the inverter lock frequency band is determined. As a third determination processing, whether any one of the current measurement values $i_{v-r}$, $i_{w-r}$, and $i_{u-r}$ is equal to or more than the upper limit value B[A] is determined.

If the result of the first determination processing is "NO", the map cannot be switched because it is in the switching inhibition time. Further, if at least any one of the results of the second and third determination processings is "NO", it can be determined that the inverter protection control is never executed. Therefore, if even one of the determination results of the first to third determination processings in step S10 is "NO", the instruction value computing unit 22 holds a currently selected map (S12). On the other hand, if all the determination results of the three determination processings are "YES", of the first map and the second map, the instruction value computing unit 22 switches to a not currently selected one (S14). Further, after the switching of the map, the instruction value computing unit 22 sets a switching inhibition time (S16).

In the meantime, as described above, in the second map, the output efficiency of the rotating electric machine 12 is lower compared to the first map. For this reason, in a driving condition in which no hunting for switching of the map occurs, that is, if the electrical frequency $f_{com}$ is sufficiently apart from the inverter lock frequency band, it is preferable to switch to the first map immediately without waiting for the switching inhibition time as shown in FIGS. 7A through 7D.

Figure 8:
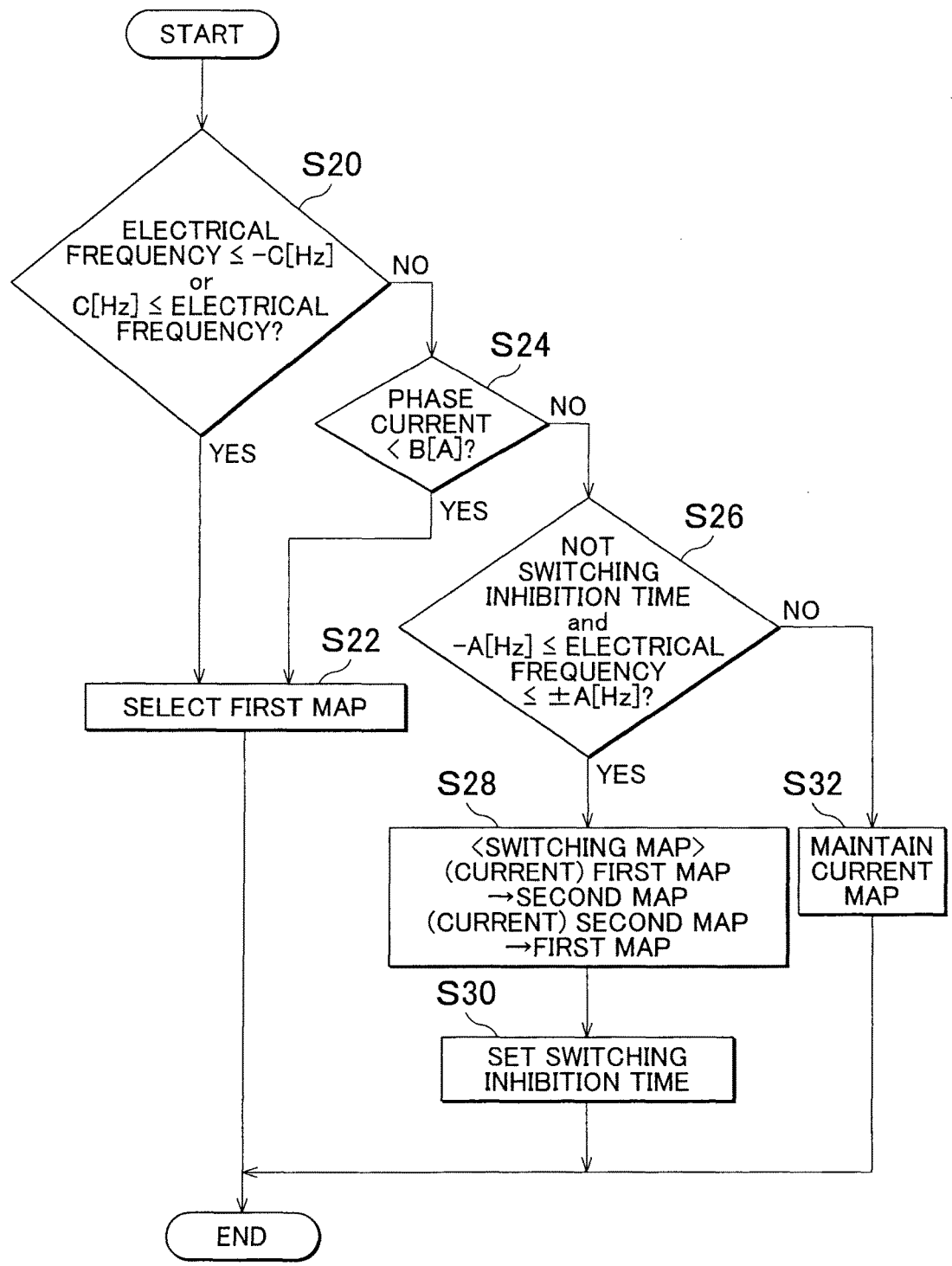
FIG. 8 is a flow chart for explaining the determination flow of the inverter lock avoidance control.

Thus, like in the flow chart of FIG. 8, first map selection flow may be provided before or after determination of the switching inhibition time. The instruction value computing unit 22 provides a lower threshold—C [Hz] and an upper threshold C [Hz] which are sufficiently apart from the lower limit value—A [Hz] and the upper limit value A [Hz], respectively, of the inverter lock frequency band, and determines whether the electrical frequency $f_{com}$ is equal to or less than the lower threshold—C or at or equal to or more than the upper threshold C (S20).

For example, the upper threshold C may be a larger frequency by an amount equal to the inverter lock frequency than the upper limit value A of the inverter lock frequency band. That is, it is permissible that C=A+(A−(−A)). Likewise, it is also permissible that lower threshold—C=−A−(A−(−A)).

In step S20, if the electrical frequency $f_{com}$ is equal to or less than the lower threshold—C or equal to or more than the upper threshold C, the instruction value computing unit 22 selects the first map irrespective of whether the switching inhibition time has passed (S22).

Further, if the electrical frequency $f_{com}$ is in a range from the lower threshold—C to the upper threshold C, the instruction value computing unit 22 determines whether any one of the current measurement values $i_{u-r}$, $i_{v-r}$, and $i_{w-r}$ is less than the upper limit value B[A] (S24). Because no inverter protection control is executed when any one of the current measurement values $i_{u-r}$, $i_{v-r}$, and $i_{w-r}$ is less than the upper limit value B[A], the instruction value computing unit 22 selects the first map irrespective of whether the switching inhibition time has passed (S22).

In step S24, if any one of the current measurement values $i_{u-r}$, $i_{v-r}$, and $i_{w-r}$ is equal to or more than the upper limit value B[A], the instruction value computing unit 22 determines whether it is in the switching inhibition time and whether the electrical frequency $f_{com}$ is included in the inverter lock frequency band (S26). If the switching inhibition time has passed and the electrical frequency $f_{com}$ is included in the inverter lock frequency band, the switching of the map is executed (S28) and the switching inhibition time is set (S30). In the switching inhibition time or if the electrical frequency $f_{com}$ is out of the inverter lock frequency band, a current map is maintained (S32).

The invention claimed is:

1. A control device for a rotating electric machine, the control device comprising:
    an electronic control unit configured to output an instruction signal in response to a driving request to the rotating electric machine; and
    an inverter configured to convert direct current power into alternating current power based on the instruction signal and supply the converted alternating current power to the rotating electric machine,
    the electronic control unit being configured to:
    (a) calculate a slip frequency of the rotating electric machine from a torque instruction value to the rotating electric machine and a target value of output efficiency to the rotating electric machine;
    (b) calculate a frequency of the instruction signal from the slip frequency and a rotational frequency of the rotating electric machine; and
    (c) change the slip frequency so as to change the frequency of the instruction signal to out of an inverter lock frequency band, the slip frequency being changed by changing the target value of the output efficiency with the torque instruction value maintained and an output torque maintained, when the frequency of the instruction signal is included in the inverter lock frequency band,
    wherein the electronic control unit is configured to inhibit the frequency of the instruction signal from being changed to within the inverter lock frequency band for a predetermined period after the frequency of the instruction signal is changed to out of the inverter lock frequency band.

2. A control method for a rotating electric machine, wherein the rotating electric machine is controlled by an electronic control unit and an inverter, the electronic control unit outputting an instruction signal in response to a driving request of the rotating electric machine and the inverter configured to convert direct current power into alternating current power based on the instruction signal and supply the converted alternating current power to the rotating electric machine,
    the control method comprising:
    (a) calculating, by the electronic control unit, a slip frequency of the rotating electric machine from a torque instruction value to the rotating electric machine and a target value of output efficiency to the rotating electric machine;
    (b) calculating, by the electronic control unit, the frequency of the instruction signal from the slip frequency and a rotational frequency of the rotating electric machine; and
    (c) changing, by the electronic control unit, the slip frequency so as to change the frequency of the instruction signal to out of an inverter lock frequency band, the slip frequency being changed by changing the target value of the output efficiency with the torque instruction value maintained and an output torque maintained, when the frequency of the instruction signal is included in the inverter lock frequency band, wherein the frequency of the instruction signal is inhibited from being changed to within the inverter lock frequency band for a predetermined period by the electronic control unit after the frequency of the instruction signal is changed to out of the inverter lock frequency band by the electronic control unit.

3. A control device for a rotating electric machine, the control device comprising:

an electronic control unit configured to output an instruction signal in response to a driving request to the rotating electric machine; and an inverter configured to convert direct current power into alternating current power based on the instruction signal and supply the converted alternating current power to the rotating electric machine, the electronic control unit being configured to:

(a) calculate a slip frequency of the rotating electric machine from a torque instruction value to the rotating electric machine and a target value of output efficiency to the rotating electric machine;

(b) calculate a frequency of the instruction signal from the slip frequency and a rotational frequency of the rotating electric machine; and (c) change the slip frequency so as to change the frequency of the instruction signal to out of an inverter lock frequency band, the slip frequency being changed by changing the target value of the output efficiency with the torque instruction value maintained, when the frequency of the instruction signal is included in the inverter lock frequency band, wherein the electronic control unit is configured to inhibit the frequency of the instruction signal from being changed to within the inverter lock frequency band for a predetermined period after the frequency of the instruction signal is changed to out of the inverter lock frequency band.

* * * * *